(12) United States Patent
Lara et al.

(10) Patent No.: US 11,416,851 B2
(45) Date of Patent: Aug. 16, 2022

(54) DYNAMIC CURRENCY CONVERSION SELECTION AND CONTROL PROCESSING

(71) Applicant: NCR Corporation, Atlanta, GA (US)

(72) Inventors: Arnold Bacalla Lara, Mandaue (PH); Jullan Raphael Lim, Bentonville, AR (US)

(73) Assignee: NCR Corporation, Atlanta, GA (US)

( * ) Notice: Subject to any disclaimer, the term of this patent is extended or adjusted under 35 U.S.C. 154(b) by 28 days.

(21) Appl. No.: 16/660,350

(22) Filed: Oct. 22, 2019

(65) Prior Publication Data
US 2021/0117963 A1    Apr. 22, 2021

(51) Int. Cl.
  *G06Q 20/38*    (2012.01)
  *G06Q 20/24*    (2012.01)
  *G06Q 20/40*    (2012.01)
  *G06Q 20/32*    (2012.01)

(52) U.S. Cl.
  CPC ........... *G06Q 20/381* (2013.01); *G06Q 20/24* (2013.01); *G06Q 20/3274* (2013.01); *G06Q 20/401* (2013.01)

(58) Field of Classification Search
  None
  See application file for complete search history.

(56) References Cited

U.S. PATENT DOCUMENTS

| | | | | |
|---|---|---|---|---|
| 9,747,599 B2* | 8/2017 | Raymond | ............. | G06Q 40/00 |
| 2004/0128240 A1* | 7/2004 | Yusin | ........................ | G07F 7/08 |
| | | | | 705/42 |
| 2010/0036741 A1* | 2/2010 | Eleven | .................... | G06Q 20/24 |
| | | | | 705/17 |
| 2015/0170112 A1* | 6/2015 | DeCastro | ............. | G06Q 20/381 |
| | | | | 705/39 |
| 2015/0294413 A1* | 10/2015 | Jonas | ...................... | G06Q 40/04 |
| | | | | 705/37 |
| 2017/0140371 A1* | 5/2017 | Forzley | ................ | G06Q 20/065 |
| 2017/0213219 A1* | 7/2017 | Garden | ............. | G06Q 20/4016 |
| 2020/0082406 A1* | 3/2020 | Timko | ................ | G06Q 20/382 |

\* cited by examiner

*Primary Examiner* — Kirsten S Apple
*Assistant Examiner* — Matthew Cobb
(74) *Attorney, Agent, or Firm* — Schwegman, Lundberg & Woessner (57) ABSTRACT

A terminal receives card details for a payment card to process payment for a transaction. The card and transaction details are sent to an intermediate server. The card details are identified as being associated with a card issuer associated with a first currency while the terminal is associated with a second different currency from the first currency. A currency conversion entity selection request is sent to the card issuer. The card issuer requests a consumer select a currency conversion entity for payment at the terminal. A mobile device of the consumer generates encoded data representing: a selected currency conversion entity, the card details, and the transaction details. The encoded data is processed to verify and process payment for the transaction with the selected currency conversion entity preventing any override by a merchant to use a different currency conversion entity at the terminal.

9 Claims, 4 Drawing Sheets

DYNAMIC CURRENCY CONVERSION SELECTION AND CONTROL PROCESSING

BACKGROUND

Consumers face a variety of scams designed to defraud consumers out of money, such scams include fake websites, fake text messages, fake phone calls, and more. With respect to payment cards, the scams are even more diverse ranging from stealing payment card numbers through card skimmers, hackers that penetrate retail web sites and steal private consumer payment card data, waiters that take photographs of consumer payment cards, and others.

One scam with respect to consumer payment cards that receives less attention is perpetrated through Dynamic Currency Conversion (DCC) or cardholder preferred currency services offered by third-party operators to the local merchants. DCC services only become a scam when a consumer's currency conversion selection for a transaction is fraudulently overridden by the merchant when DCC services were not originally selected by the consumer for the transaction to perform the needed currency conversion. These services allow a merchant to obtain a conversion from the home currency of the cardholder to the local currency associated with the merchant, such that the merchant or merchant bank is paid directly through the third-party service (the third-party service then charging the consumer's card issuer). This results in a fee that the merchant or the merchant's bank can charge to the consumer for the transaction. Sometimes these fees can be as much as 18% of the transaction total; sometimes the fees are less than what the card issuer charges the consumer for the currency conversion. Sometimes, the DCC service's fees are higher than what the consumer's card issuer would charge for converting from the consumer's home currency to the local currency (some card issuer's charge no conversion fees at all) and directly paying the merchant's bank. Card issuers require that merchants disclose fees associated with using DCC services to the consumer. These fees are usually expressed in terms of the consumer's home currency.

Consumers would not elect to use a DCC third party service that converts the currencies and then charges the consumer's card issuer a transaction total that includes the conversion fee in the consumer's home currency when the DCC service's fees are higher than what the card issuer of the consumer would charge for the currency conversion. The DCC scam occurs when the consumer elects not to use the DCC service and sticks with the card issuer as the primary currency conversion entity for the transaction and the merchant fraudulently forces the primary currency conversion entity (overrides the consumer selection) in favor of the DCC service before the payment for a transaction is processed. These DCC scams occur frequently in the industry leading some to question the benefits of DCC services entirely. But, sometimes the DCC service's currency conversion fees are lower the card issuer's fees, since the card issuer may also charge a foreign transaction fee in addition to currency conversion fees.

Currently, there is no way to ensure that consumers are not either duped into using DCC services for a foreign transaction or fraudulently forced into using a currency conversion entity that benefits the merchant to the detriment of the consumer. That is, because the merchant can an override to use DCC services before the card issuer sees the transaction, consumers are continually exposed to this type of foreign fraud, which substantially increases fees that consumers would not otherwise have to pay for foreign transactions.

SUMMARY

In various embodiments, methods and a device for dynamic currency conversion (DCC) selection and control processing are presented.

According to an aspect, a method for DCC selection and control processing is presented. Card details and transaction details are obtained from a terminal requesting a payment for a transaction. A first currency associated with a card issuer is identified from the card details that is different from a second currency that is associated with the terminal. The card issuer is requested to request a currency conversion entity selection requesting the card issuer to request a currency conversion entity selection that identifies an entity that will convert the first currency to the second currency for a consumer associated with the transaction. Encoded data is acquired from the terminal representing the card details, the transaction details, and the currency conversion entity selection made by the consumer. The currency conversion entity selection from the encoded data and the card details, the transaction details, a first currency identifier for the first currency, and a second currency identifier for the second currency are sent to the currency conversion entity selection to process the payment on behalf of the consumer at the terminal.

DETAILED DESCRIPTION

Figure 1:
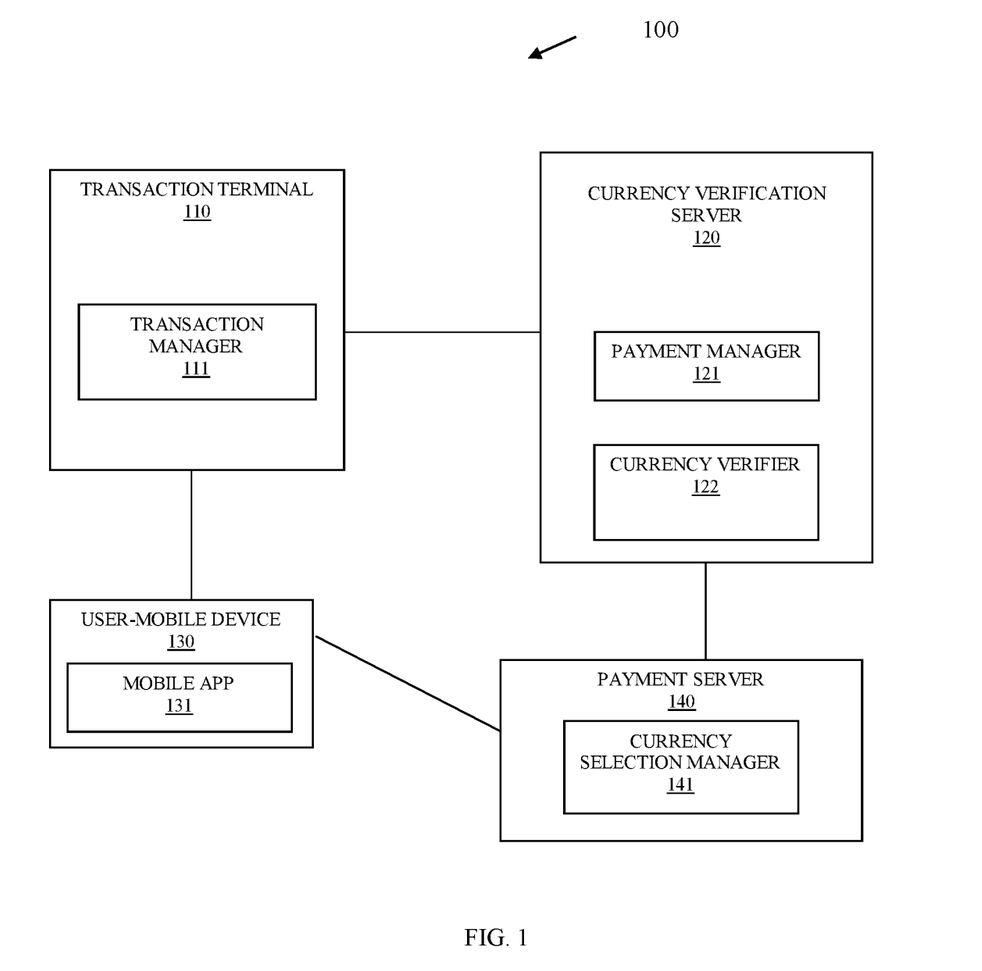
FIG. 1 is a diagram of a system for DCC selection and control processing, according to an example embodiment.

FIG. 1 is a diagram of a system 100 for DCC selection and control processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of DCC selection and control processing presented herein and below.

The system 100 includes a transaction terminal 110, a currency verification server 120, a user-mobile device 130, and one or more payment servers 140. Each device 110-140 includes its own processor and non-transitory computer-readable storage media comprising executable instructions that are executed by the processor to perform the processing discussed below with respect to the transaction manager 111 of terminal 110; payment manager 121 and currency verifier 122 of server 120; currency selection manager 141 of payment server 140; and mobile application (app) of user-mobile device 130.

Conventionally, during a transaction involving a consumer that uses a payment card associated with a card issuer in a first currency (home currency of the consumer) where the transaction location is associated with a second local currency (currency of the country for the merchant of the transaction) and where the merchant offers a third-party DCC service, there is no way to guarantee that a consumer can avoid a merchant perpetrated fraud where the merchant intentionally overrides a consumer-desired currency conversion entity (DCC service of merchant (local) or card issuer (home)) and uses a currency conversion entity that is most beneficial to the merchant and most detrimental (in terms of fees) to the consumer. This can result in merchant scams that can stick the consumer with excessive fees as discussed above.

These issues are solved with system 100 by ensuring that a transaction currency conversion selection made by the consumer cannot be overridden by the merchant to select a different currency conversion entity for payment of the transaction.

During a local merchant transaction with a consumer at a merchant location associated with a country that is foreign to the home country of the consumer and when payment for the transaction is needed to complete the transaction, the consumer or the merchant (on behalf of the consumer) swipes or presents a payment card as payment for the transaction at terminal 110. Upon swiping the card or presenting the card, transaction manager 111 contacts payment manager 121 of server 120. Payment manager 121 detects from the transaction details and the card details that the card issuer of the consumer is associated with a home currency of the consumer that is different from a local currency associated with the merchant. Payment manager 121 contacts the card issuer of the payment card through the appropriate payment server 140, providing transaction and card details for the transaction along with the local currency associated with the transaction. The currency selection manager 141 of the corresponding payment server 140 (for the card issuer of the consumer) then indicates the acceptable currency conversion services that are available to the consumer (local through a DCC service of the merchant or home through the card issuer). That is, conversion of the home currency to the local currency can be done by the card issuer as payment for the transaction or the currency conversion can be done by a DCC service of the merchant associated with the local currency. The choice of currency conversion services (card issuer or DCC service of the merchant) is sent by currency selection manager to mobile app 131 of consumer-mobile device 130 (user-mobile device 130) for selection by the consumer.

The acceptable choice of currency conversions (local conversion or home conversion by card issuer) may be sent to a mobile application (app) 131 of mobile device 130. The consumer selects either local or home currency conversion as a response. The response may be through a user-facing interface of the mobile app 131 that identifies a selection for either the local currency conversion (DCC service of merchant) or the home currency conversion of the card issuer. Responsive to the consumer selection, mobile app 131 encodes the card details, the transaction details, and currency conversion selection in encoded data (such as a Quick Response (QR) code or a Near-Field Communication (NFC) code).

Once currency selection manager 141 send the currency conversion selection request to mobile app 131, currency selection manager 141 sends a notification back to payment manager 121. Payment manager 121, upon receipt of the notification, instructs transaction manager 111 to request the encoded data from the consumer at the terminal 110.

Transaction manager 111 requests the encoded data from the consumer to continue to a payment confirmation screen or Personal Identification Number (PIN) required to conclude the transaction at terminal 110. Consumer, who is operating device 130, is prompted to provide the encoded data. This can be provided by displaying the encoded data on a display of the device 130 as a QR code for scanning by a camera or scanner of terminal 110 or through a wireless passing of the encoded data from device 130 to terminal 110, such as through an NFC tap on an NFC transceiver of terminal 110.

Transaction manager 111 then displays necessary disclosures required by rules, regulations, or agreements between the merchant and card issuer that identifies the consumer's currency conversion selection (local conversion through the DCC service of the merchant or home conversion through the card issuer). The consumer then enters any required PIN to conclude the transaction or confirms and acknowledges the currency conversion selection when no such PIN is required for the transaction to proceed.

Transaction manager 111, upon confirming the selection, transmits the encoded data to the payment manager 121. Payment manager 121 provided the encoded data to currency verifier 122, which identifies which currency conversion entity that the customer desires to use as a primary currency conversion entity of the transaction (local DCC service or card issuer (home)), the card details, and transaction details by decoding the encoded data. The decoded data is supplied from verifier 122 back to payment manager 121. Payment manager 121 then provides the transaction details and card details along with any encrypted entered PIN supplied by the consumer to the payment server 140 (card issuer 140) when the decoded encoded data includes a home currency conversion selection. When the decoded encoded data includes a local currency conversion selection, payment manager 121 forwards the transaction details, card details, and any encrypted PIN to the appropriate DCC service associated with the merchant (the DCC service pays the merchant for the transaction and obtains payment for paying the transaction with the card issuer in a home currency associated with the card issuer and including any fees being charged by the DCC service).

After either the card issuer or the DCC service performs the currency conversion, a notification is sent back to payment manager 121. Payment manager 121 sends the notification back to transaction manager 111. Transaction manager 111 concludes the transaction with the consumer and merchant.

Because the selection of who is to do the currency conversion (local DCC service or home card issuer) is controlled through the encoded data that is supplied by the consumer through mobile app 131, there is no ability of the merchant to override the currency conversion selection after the consumer confirms his/her choice. Any attempt at an override after payment confirmation (PIN entry or confirmation selection) is either ignored by transaction manager 111 with processing continued using the consumer selected conversion entity (DCC service (local) or card issuer (home)) or causes transaction manager 111 to abort the transaction entirely.

Transaction manager 111 is notified by payment manager 121 to obtain a currency conversion selection from a consumer when the card issuer is associated with a currency that is different from a second currency associated with a location of the terminal. The currency conversion selection is provided as encoded data, which cannot be modified by the merchant through any override. Payment manager 121 expects encoded data to be received from transaction manager 111 when payment manager 121 detects the local and home currencies; anything else received from transaction manager 111 will not be accepted or processed and will cause the transaction to be aborted. In this way, even if transaction manager 111 were to be corrupted by the merchant in some way, the merchant can still not override a currency conversion selection made by the consumer.

The system 100 prevents a fraudulent merchant from override a currency conversion selection and prevents the merchant from submitting the transaction for payment to a DCC service of the merchant when the consumer has not elected to use the DCC services of the merchant. Transaction manager 111 does not allow any override and even if transaction manager 111 is corrupted, payment manager 121 knows when encoded data is required for the currency conversion selection and will not permit any attempted override. As a result, DCC scams can be avoided and cannot be perpetrated by the merchant against the consumer by overriding a consumer currency conversion selection provided after PIN entry or conversion confirmation selection by the consumer.

In an embodiment, the transaction terminal is a Point-Of-Sale (POS) terminal, a Self-Service Terminal (SST), or a kiosk.

In an embodiment, the payment manager 121 and currency verifier 122 are enhanced version of JetPay® distributed by NCR corporation.

In an embodiment, the encoded data includes a digital signature of the card issuer, which is verified by the currency verifier 122, such that even if transaction manager 111 were modified to produce an override with a different currency conversion selection from that which was selected by the consumer, payment manager 121 will still deny the attempted override because even a corrupted version of transaction manager 111 will not be able to reproduce the card issuer's digital signature. In an embodiment, the encoded data may also include a random hash value and/or transaction-based hash value to further prevent any attempted fraudulent override of a consumer currency conversion selection.

These and other embodiments will now be discussed with reference to the FIGS. 2-4.

Figure 2:
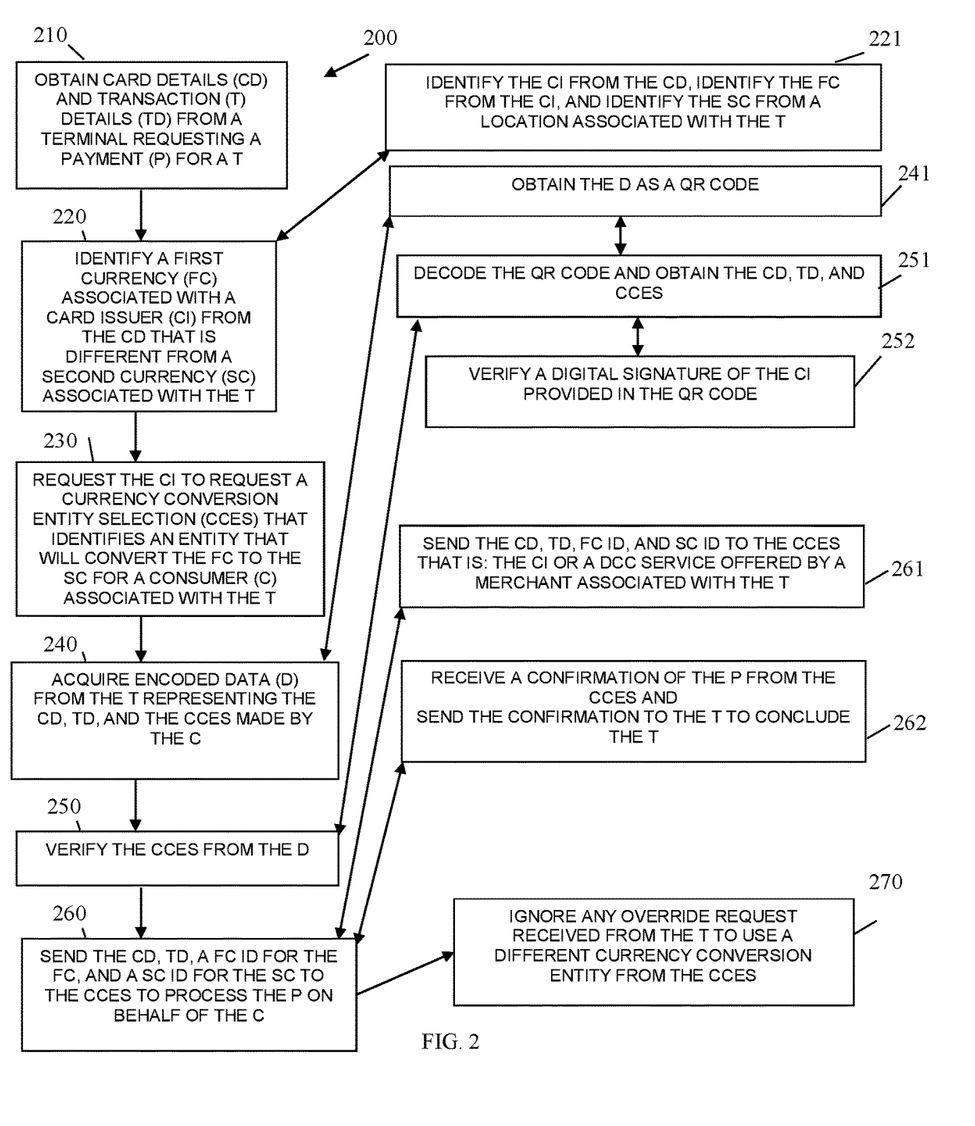
FIG. 2 is a diagram of a method for DCC selection and control processing, according to an example embodiment.

FIG. 2 is a diagram of a method 200 for DCC selection and control processing, according to an example embodiment. The software module(s) that implements the method 200 is referred to as a "DCC selection manager." The DCC selection manager is implemented as executable instructions programmed and residing within memory and/or a non-transitory computer-readable (processor-readable) storage medium and executed by one or more processors of a device. The processor(s) of the device that executes the DCC selection manager are specifically configured and programmed to process the DCC selection manager. The DCC selection manager may include one or more network connections during operation. Any network connections can be wired, wireless, or a combination of wired and wireless.

In an embodiment, the device that executes the DCC selection manager is server 120. In an embodiment, server 120 is one of several servers that logically cooperated as a cloud or cloud processing environment.

In an embodiment, the DCC selection manager is all of or some combination of: payment manager 121 and/or the currency verifier 122.

At 210, the DCC selection manager obtains card details and transaction details from a transaction terminal 110 that is requesting payment for a transaction of a consumer.

At 220, the DCC selection manager identifies a first currency associated with a card issuer from the card details that is different from a second currency associated with the transaction terminal 110.

In an embodiment, at 221, the DCC selection manager identifies the card issuer from the card details, identifies the first currency or first currency type from the card issuer, and identifies the second currency from a location associated with the transaction terminal 110.

At 230, the DCC selection manager requests the card issuer to request a currency conversion entity selection, which identifies an entity that will convert the first currency to the second currency on behalf of the consumer associated with the transaction.

At 240, the DCC selection manager acquires encoded data from the transaction terminal 110. The encoded data representing the card details, the transaction details, and a currency conversion entity selection, which was made by the consumer.

In an embodiment, at 241, the DCC selection manager obtains the encoded data as a QR code.

At 250, the DCC selection manager verifies the currency conversion entity selection from the encoded data.

In an embodiment of 241 and 250, at 251, the DCC selection manager decodes the QR code and obtains the card details, the transaction details, and the currency conversion entity selection (which was made by the consumer).

In an embodiment of 251 and at 252, the DCC selection manager verifies a digital signature of the card issuer provided in the QR code. In an embodiment, the DCC selection manager verifies a mobile device signature provided in the QR code. In an embodiment, the DCC selection manager verifies a randomly generated and/or transaction-based hash value provided in the QR code.

At 260, the DCC selection manager sends the card details, the transaction details, a first currency type identifier for the first currency, and a second currency type identifier for the second currency to the currency conversion entity selection to process the payment for the transaction on behalf of the consumer.

In an embodiment, at 261, the DCC selection manager sends the card details, the transaction details the first currency type identifier, and the second currency type identifier to the currency conversion entity selection that is one of: the card issuer or a DCC service offered by a merchant associated with the transaction.

In an embodiment, at 262, the DCC selection manager receives a confirmation of the payment from the currency conversion entity selection and sends the confirmation to the transaction terminal 110 to conclude the transaction.

In an embodiment, at 270, the DCC selection manager ignores any override request received from the transaction terminal 110 to user a different currency conversion entity from the currency conversion entity selection.

Figure 3:
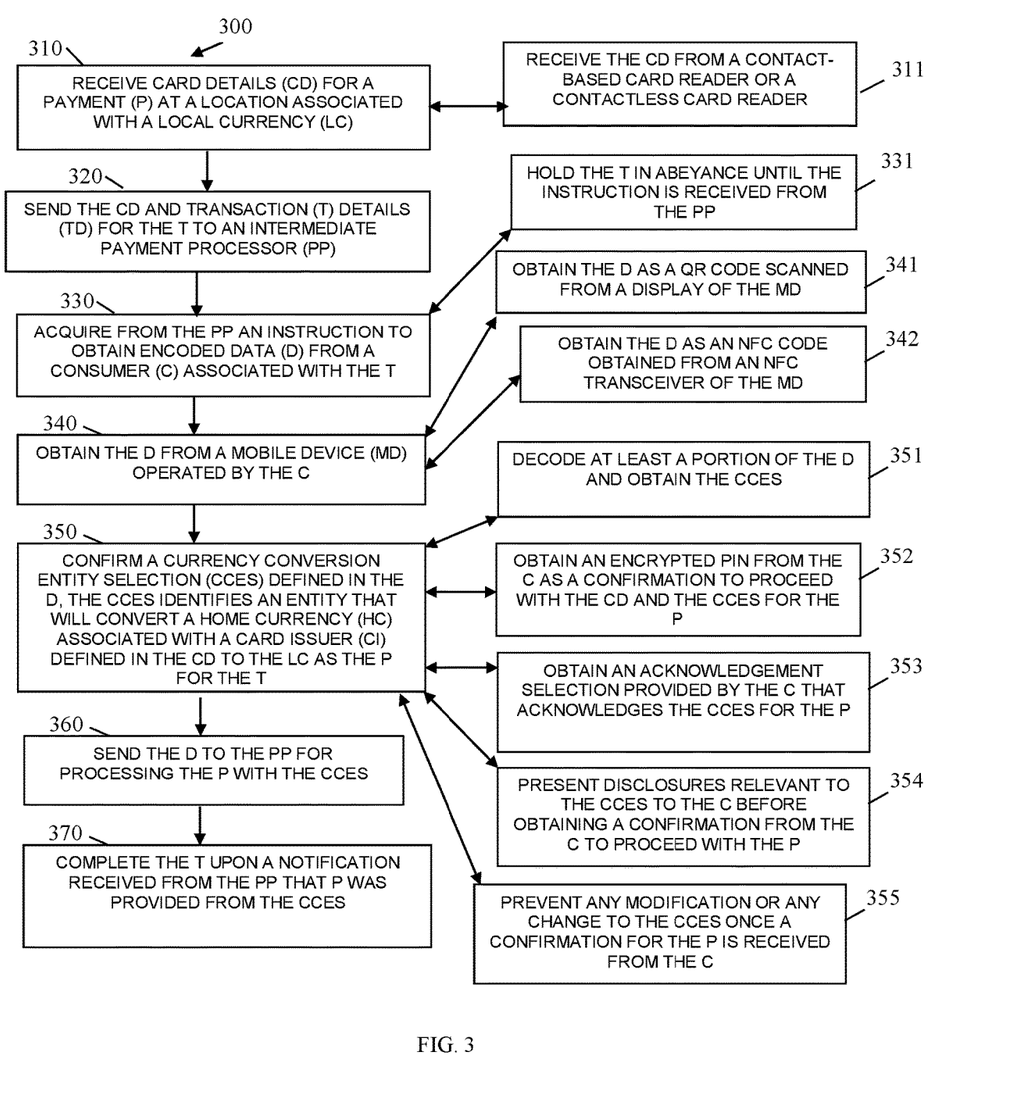
FIG. 3 is a diagram of another method for DCC selection and control processing, according to an example embodiment.

FIG. 3 is a diagram of another method 300 for DCC selection and control processing, according to an example embodiment. The software module(s) that implements the method 300 is referred to as a "DCC verifier and controller." The DCC verifier and controller is implemented as executable instructions programmed and residing within memory and/or a non-transitory computer-readable (processor-readable) storage medium and executed by a device. The processors that execute the DCC verifier and controller are specifically configured and programmed to process the DCC verifier and controller. The DCC verifier and controller one or more network connections during its processing. Any network connections to the device can be wired, wireless, or a combination of wired and wireless.

In an embodiment, the device that executes the DCC verifier and controller is transaction terminal 110. In an embodiment, terminal 110 is an SST, a POS terminal, or a kiosk.

In an embodiment, the DCC verifier and controller is the transaction manager 111.

The processing of the DCC verifier and controller as shown in FIG. 3 represents interaction between transaction terminal 110 and server 120 (method 200 representing processing of server 120).

At 310, the DCC verifier and controller receives card details for a payment at a location associated with a local currency or local currency type.

In an embodiment, at 311, the DCC verifier and controller receives the card details from a contact-based card reader (chip reader or magnetic stripe) or a contactless card reader (NFC-based).

At 320, the DCC verifier and controller sends the card details and transaction details from the transaction to an intermediate payment processor. In an embodiment, the intermediate payment processor is payment manager 121 and/or the method 200.

At 330, the DCC verifier and controller acquires from the payment processor an instruction to obtain encoded data from a consumer associated with the transaction.

In an embodiment, at 331, the DCC verifier and controller holds the transaction in abeyance until the instruction is received from the payment processor.

At 340, the DCC verifier and controller obtains the encoded data from a mobile device operated by the consumer.

In an embodiment, at 341, the DCC verifier and controller obtains the encoded data as a QR code scanned from a display of the mobile device.

In an embodiment, at 342, the DCC verifier and controller obtains the encoded data as an NFC code obtained from an NFC transceiver of the mobile device.

At 350, the DCC verifier and controller confirms a currency conversion entity selection defined in the encoded data. The currency conversion entity selection identifies an entity that will convert a home currency or home currency type associated with a card issuer defined in the card details to the local currency or local currency type as the payment for the transaction.

In an embodiment, at 351, the DCC verifier and controller decodes at least a portion of the encoded data and obtains the currency conversion entity selection.

In an embodiment, at 352, the DCC verifier and controller obtains an encrypted PIN from the consumer as confirmation to proceed with the card details and the currency conversion entity selection for the payment.

In an embodiment, at 353, the DCC verifier and controller obtains an acknowledgement selection provided by the consumer that acknowledges the currency conversion entity selection for the payment.

In an embodiment, at 354, the DCC verifier and controller presents disclosures relevant to the currency conversion entity selection to the consumer before obtaining a confirmation from the consumer to proceed with the payment processing for the payment.

In an embodiment, at 355, the DCC verifier and controller prevents any modification or any change to the currency conversion entity selection once a confirmation for the payment is received from the consumer.

At 360, the DCC verifier and controller sends the encoded data to the intermediate payment processor for processing the payment with the currency conversion entity selection.

At 370, the DCC verifier and controller completes or concludes the transaction upon a notification received from the intermediate payment processor indicating that payment was provided and confirmed from the currency conversion entity selection.

Figure 4:
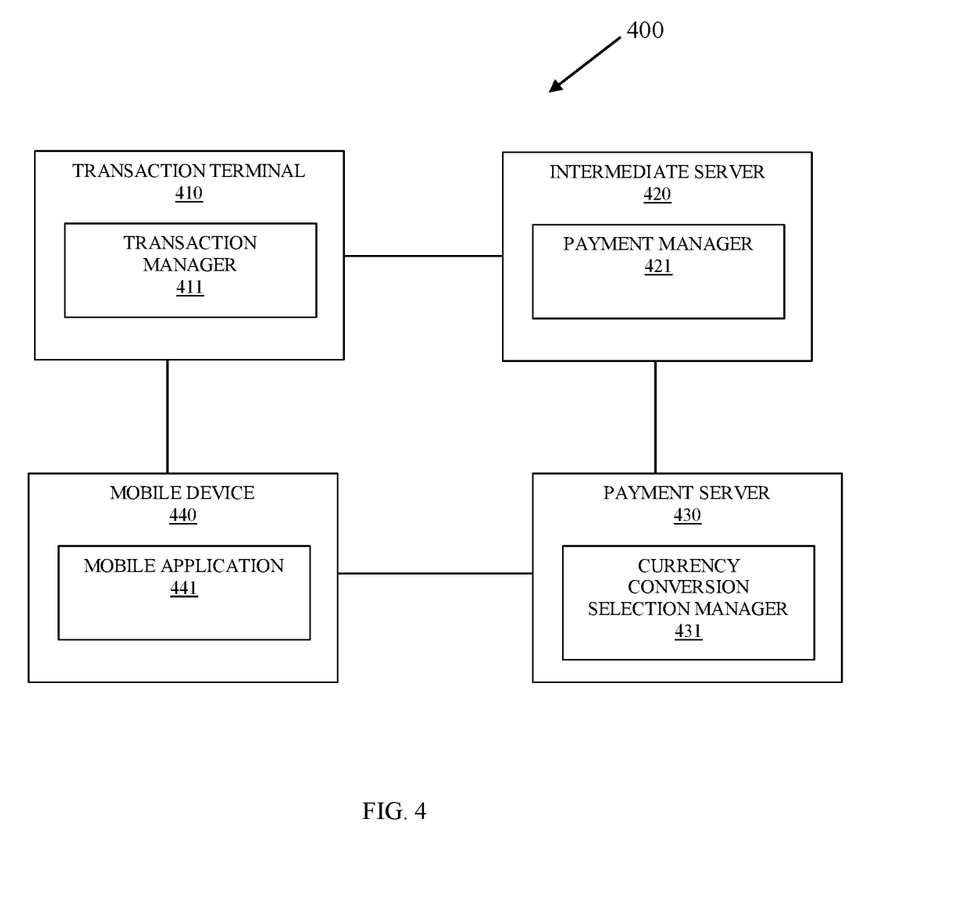
FIG. 4 is a diagram of another system for DCC selection and control processing, according to an example embodiment.

FIG. 4 illustrates a system 400 for DCC selection and control processing. The system 400 includes a variety of hardware components configured to execute software components. The system 400 has access to one or more network connections during processing of the software components. The network connections may be wired, wireless, or a combination of both wired and wireless.

In an embodiment, the system 400 is the system 100.

In an embodiment, the system 400 implements, inter alia, the processing discussed above with the FIGS. 1-3.

The system 400 includes: a transaction terminal 410, an intermediate server 420, a payment server 430, and a mobile device 440.

The transaction terminal 410 comprising a transaction processor and a transaction non-transitory computer-readable storage medium having executable instructions representing a transaction manager 411.

The transaction manager 411 when executed by the transaction processor from the transaction non-transitory computer-readable storage medium causes the transaction processor to: 1) obtain card details for a transaction; 2) provide the card details and transaction details for the transaction to a payment manager 421 of the intermediate server 420; 3) receive an instruction from the payment manager 421 to obtain encoded data from the mobile device 440; 4) confirm a currency conversion entity selection defined in the encoded data; and 5) provide the encoded data to the payment manager 421 to obtain a payment for the transaction.

The intermediate server 420 comprising an intermediate processor and an intermediate non-transitory computer-readable storage medium having the payment manager 421.

The payment manager 421 when executed by the intermediate processor from the intermediate non-transitory computer-readable storage medium comprises the intermediate processor to: 1) receive the card details and transaction details from the transaction manager 411; 2) identify a first currency associated with a location of the transaction terminal 410 and a second currency associated with a card issuer of the card details; 3) send a request to a currency conversion entity selection manager 431 of the payment server 430 to obtain the currency conversion entity selection from a consumer associated with the transaction; 4) receive a notification from the currency conversion entity selection manager 431 that a selection request was sent to the consumer; 5) send the instruction to the transaction manager 411 based on receipt of the notification; 6) obtain the encoded data from the transaction manager 411; 7) verify the encoded data; and 8) process the payment with the currency conversion entity selection.

The payment server 430 comprising a payment processor and a payment non-transitory computer-readable storage medium having executable instructions representing the currency conversion selection manager 431.

The currency conversion selection manager 431 when executed by the payment processor from the payment non-transitory computer-readable storage medium causes the payment processor to: 1) receive the request from the payment manager 421; 2) send the selection request to a mobile application 441 of the mobile device 440; and 5) send the notification to the payment manager after the selection request is sent.

The mobile device 440 comprising a mobile processor and a mobile non-transitory computer-readable storage medium having executable instructions representing the mobile application 441.

The mobile application 441 when executed by the mobile processor from the mobile non-transitory computer-readable storage medium causes the mobile processor to: 1) display the selection request on a display of the mobile device upon receipt from the currency conversion entity selection manager 431; 2) generate the encoded data with the currency conversion entity selection, the card details, and the transaction details; and 3) provide the encoded data to the transaction manager 411.

In an embodiment, the transaction terminal 410 is terminal 110. In an embodiment, terminal 110 is a POS terminal, a SST, or a kiosk.

In an embodiment, the transaction manager 411 is the transaction manager 111 and/or the method 300 of the FIG. 3.

In an embodiment, the intermediate server 420 is the server 120. In an embodiment, server 120 is one of several servers that logically cooperate within a cloud or cloud processing environment.

In an embodiment, the payment manager 421 is all or some combination of: payment manager 121, currency verifier 122, and/or the method 200 of the FIG. 2.

In an embodiment, the payment server 430 is the server 140.

In an embodiment, the currency conversion selection manager 431 is currency selection manager 141.

In an embodiment, the mobile device 440 is the mobile device 130. In an embodiment, mobile device 130 is a phone, a tablet, or a wearable processing device.

In an embodiment, the mobile application 441 is all of or some combination of mobile application 131.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing executable instructions to a processor of a transaction terminal causing the processor to perform operations comprising:
receiving card details for a payment of a transaction at a location associated with a local currency and on the transaction terminal;
sending the card details and transaction details for the transaction to an intermediate payment processor, wherein the intermediate payment processor is cloud-based set of executable instructions for a Dynamic Currency Conversion (DCC) manager;
acquiring from the intermediate payment processor an instruction to obtain encoded data from a consumer associated with the transaction;
obtaining the encoded data from a mobile device operated by the consumer;
confirming a currency conversion entity selection defined in the encoded data, wherein the currency conversion entity selection identifies an entity that will convert a home currency associated with a card issuer defined in the card details to the local currency as the payment for the transaction;
sending the encoded data to the intermediate payment processor for processing the payment with the currency conversion entity selection;
completing the transaction upon a notification received from the intermediate payment processor that payment was provided from the currency conversion entity selection; and
aborting the sending and the completing on any attempt that is made to change the encoded data comprising the currency conversion entity selection from or on the transaction terminal and thereby preventing any override attempted before the encoded data is sent to the intermediate payment processor for processing the payment with the currency conversion entity selection.

2. The method of claim 1, wherein receiving further includes receiving the card details from a contact-based card reader or a contactless card reader.

3. The method of claim 1, wherein acquiring further includes holding the transaction in abeyance until receiving the instruction from the intermediate payment processor.

4. The method of claim 1, wherein obtaining further includes obtaining the encoded data as a Quick Response (QR) code scanned from a display of the mobile device.

5. The method of claim 1, wherein obtaining further includes obtaining the encoded data as a Near-Field Communication (NFC) code obtained from an NFC transceiver of the mobile device.

6. The method of claim 1, wherein confirming further includes decoding at least a portion of the encoded data and obtain the currency conversion entity selection.

7. The method of claim 1, wherein confirming further includes obtaining an encrypted Personal Identification Number (PIN) from the consumer as a confirmation to proceed with the card details and the currency conversion entity selection for the payment.

8. The method of claim 1, wherein confirming further includes obtaining an acknowledgement selection provided by the consumer that acknowledges the currency conversion entity selection for the payment.

9. The method of claim 1, wherein confirming further includes presenting disclosures relevant to the currency conversion entity selection to the consumer before obtaining a confirmation from the consumer to proceed with the payment from the currency conversion entity selection.

* * * * *